United States Patent Office 3,329,715
Patented July 4, 1967

3,329,715
STABILIZING MONOMERIC ACRYLAMIDE WITH MANGANESE IONS
Max Strohmeyer and Heinrich Scholz, Ludwigshafen (Rhine), Germany, assignors to Badische Anilin- & Soda-Fabrik Aktiengesellschaft, Ludwigshafen (Rhine), Germany
No Drawing. Filed July 28, 1964, Ser. No. 385,755
Claims priority, application Germany, Aug. 3 1963, B 72,988
5 Claims. (Cl. 260—561)

This invention relates to the stabilizing of acrylamide. More specifically, the invention relates to a new stabilizing agent.

Many stabilizers for acrylamide are already known. In the production of acrylamide from acrylonitrile by the action of concentrated sulfuric acid, the acrylamide is usually stabilized with iron salts or copper salts or with organic stabilizers, such as hydroquinone, in the neutralization of acrylamide sulfate with sodium nitrite. All prior art stabilizers have the disadvantage that they disturb the polymerization of acrylamide or cause discoloration.

It is an object of this invention to provide a new stabilizer for monomeric acrylamide. It is another object of the invention to provide a new method of stabilizing acrylamide either during or after its production from acrylonitrile. It is a further object of the invention to provide a process for stabilizing acrylamide during its production in which the stabilizer need not be removed after the production.

These objects are achieved by stabilizing the monomeric acrylamide by the addition of 0.001 to 0.3% by weight of divalent manganese ions.

The addition may be made to an unstabilized acrylamide which has already been prepared or may take place during the production of acrylamide by conventional methods.

Production of acrylamide may be effected for example by the action of about 1 mole of sulfuric acid of 75 to 85% concentration on about 1 mole of acrylonitrile and about 1 to 2 moles of water at a temperature of 70° to 85° C., and atmospheric pressure. The divalent manganese ions are advantageously mixed with the acrylonitrile prior to the reaction. The reaction mixture is then neutralized, for example with gaseous or aqueous ammonia, and the acrylamide recovered by cooling and centrifuging after ammonium sulfate has been separated.

The divalent manganese ions are added for example in the form of non-oxidizing organic or inorganic salts, particularly in aqueous solution, which may be acid. Solutions of manganese salts in lower alcohols with up to 4 carbon atoms or in lower fatty acids with up to 4 carbon atoms may however also be used. The manganese salts are in general used in the form of 10 to 40% solutions.

Examples of suitable manganese salts are the halides, for example manganese chloride, manganese fluoride or manganese bromide, or the sulfate or phosphate, and also the formate, acetate, oxalate, benzoate or acrylate. Naturally only those manganese salts are used which contain no coloring anions or anions which may give rise to discoloration.

When they are added in the reaction of acrylonitrile with aqueous sulfuric acid, the divalent manganese ions not only stabilize during the production of the acrylic sulfate but also during the following neutralization, i.e. no additional supply of stabilizer is necessary.

Adding divalent manganese ions not only has the advantage that the stabilizer can be left in the monomers in a subsequent polymerization, but also that the stabilizing effect is better than that of iron ions or of nitrite. If it is desired to remove the stabilizer from the monomeric amide, this may be done for example by adding an about equivalent amount of phosphates and separating the manganese (II) phosphate formed.

The invention is illustrated by the following examples.

Example 1

Acrylamide is prepared as follows:

150 ml. of 85% sulfuric acid is placed in a 500 ml. flask fitted with a stirrer and 150 ml. of acrylonitrile and 0.25 ml. of 30% aqueous manganous sulfate solution are added continuously within ninety minutes at 75° C. with continuous stirring. The mixture is then stirred for another three hours at 75° C. and the melt is neutralized in about 150 ml. of water at a pH of 3 to 6 with gaseous ammonia. Ammonium sulfate is filtered off at 30° to 50° C., the solution is cooled to about 0° C. and the acrylamide is filtered off. To test the inhibiting effect, the time taken for a ball 3 mm. in diameter to fall from a height of 55 mm. in the acrylamide melt at 100° C. is determined. The results are given in Table 1 which gives the time taken for the ball to fall in (A) a melt stabilized with 0.04% of ferrous sulfate, (B) a melt stabilized with 0.07% of cupric sulfate and (C) a melt stabilized with 0.01% of manganous sulfate.

TABLE 1

| Sample | Time in seconds | | | | |
|---|---|---|---|---|---|
| | At the beginning | After, hours | | | |
| | | 0.5 | 1 | 2.5 | 3.5 |
| A | 4 | 5 | 5 | 5 | 5 |
| B | 3.5 | 4.5 | 4.5 | 4.5 | 6.5 |
| C | 2.5 | 3 | 3 | 3.5 | 3.5 |

Another test of the inhibiting effect is the solubility in water of the monomers after storage periods of varying length. If acrylamide samples which have been stabilized with 0.4% of iron (A) with 0.07% of copper (B) and with 0.01% of manganese (C) are heated for ten hours at 60° C. and then dissolved in water, the results given in Table 2 are obtained:

TABLE 2

| Sample | Solubility in water |
|---|---|
| A | Polymerization has begun, only half soluble. |
| B | Do. |
| C | Clearly soluble. |

Example 2

Acrylamide free of stabilizer is stabilized by adding manganese salt. To test the stabilizing effect, the viscosity is determined in the same way as in Example 1. The results are given in Table 3 which gives the time taken for the ball to fall in a melt stabilized with 0.014% of manganese-II ions in the form of (A) manganous chloride, (B) acid manganous phosphite, (C) manganous stearate and (D) manganous acetate.

TABLE 3

| Sample | Time in seconds | | | | |
|---|---|---|---|---|---|
| | At the beginning | After, hours | | | |
| | | 0.5 | 1 | 2.5 | 3.5 |
| A | 3 | 4 | 4 | 4.5 | 4.5 |
| B | 3 | 3 | 3 | 3 | 3 |
| C | 3 | 3 | 3 | 3 | 3 |
| D | 3 | 3 | 3 | 3 | 3.5 |

We claim:

1. A process for stabilizing acrylamide wherein 0.001 to 0.1% by weight of divalent manganese ions is added to acrylamide as a stabilizer for the monomeric acrylamide.

2. A process for stabilizing acrylamide wherein from 0.001 to 0.1% by weight of divalent manganese ions is added during the production of the acrylamide by the reaction of acrylonitrile and concentrated sulfuric acid and subsequent neutralization of the reaction mixture.

3. Acrylamide containing 0.001 to 0.1% by weight of divalent manganese ions as a stabilizer for the monomeric acrylamide.

4. Acrylamide containing 0.001 to 0.1% by weight divalent manganese ion in the form of a manganous non-oxide salt as a stabilizer for the monomeric acrylamide.

5. Acrylamide according to claim 4 to which the manganese ion has been added in the form of manganous sulfate.

References Cited

UNITED STATES PATENTS

| 2,661,346 | 12/1953 | Wesp et al. | 260—45.75 |
| 3,260,697 | 7/1966 | Babler | 260—45.75 |
| 3,274,151 | 9/1966 | Settele | 260—45.75 |

ALEX MAZEL, *Primary Examiner.*

NICHOLAS S. RIZZO, *Examiner.*

JOSEPH A. NARCAVAGE, *Assistant Examiner.*